Patented Jan. 4, 1944

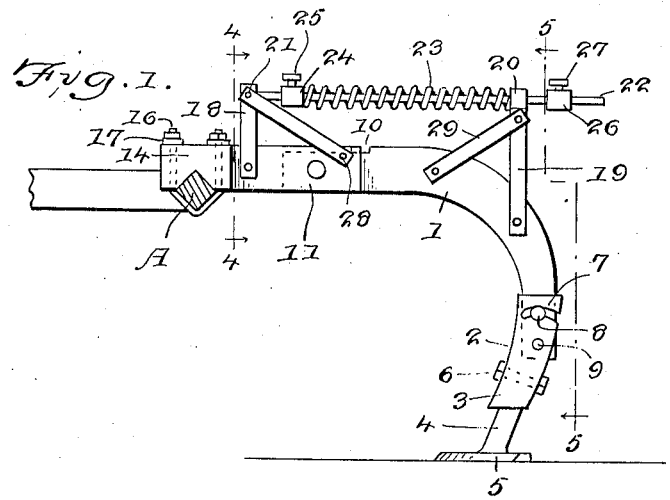

2,338,374

UNITED STATES PATENT OFFICE 2,338,374

CULTIVATOR ATTACHMENT

Hollie D. Baldwin, Meggett, S. C.

Application September 22, 1941, Serial No. 411,924

1 Claim. (Cl. 97—198.1)

This invention relates to cultivator attachments, and its general object is to provide a device in the form of a tool carrying beam, that is primarily designed for use on tractor cultivators, the device being flexible for disposal of the tool, such as a sweep or other ground engaging or working means, substantially at a uniform height relative to the ground, regardless of the irregularity of the ground surface, that is in the event the wheels of the tractor should travel over a ridge or the like, or drop into a depression, such will not materially affect the position of the tool, yet the latter can be raised or lowered to bring about the desired adjustment thereof by the usual hand lever or power means, and of course through the medium of the device and the usual beam bar or frame of the tractor to which the device is attached.

A further object is to provide a tool attachment for tractor cultivators, that can be secured to the usual beam bar or frame of the tractor, in an easy and expeditious manner, and the attachment is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a side elevation, illustrating my device in position for use and secured to a beam bar of a tractor cultivator.

Figure 2 is a top plan view thereof.

Figure 3 is a side elevation illustrating the device in raised position.

Figure 4 is a sectional view taken approximately on line 4—4 of Figure 1, looking in the direction of the arrows.

Figure 5 is a sectional view taken approximately on line 5—5 of Figure 1, looking in the direction of the arrows.

Figure 6 is an enlarged fragmentary top plan view of the attaching bracket for the device.

Referring to the drawing in detail, it will be noted that I have illustrated my device as being secured to a single beam bar A of a tractor cultivator, but it can be secured to a double bar or frame.

The device in the form shown includes an arcuate body or beam member 1 having a foot 2 secured to the lower end thereof, the foot being curved along its length and includes a square cornered socketed lower portion 3 for receiving the shank 4 of a sweep 5, the shank being secured within the socket by a bolt and nut connection 6. The foot 2 is adjustable relative to the body for varying the angle of the sweep with respect to the ground, and for that purpose, the upper portion of the foot at the rear thereof is open, as best shown in Figure 5, and the side walls have arcuate slots 7 therein, with the extending portions of a pin 8 mounted within the slots, the pin extending transversely through the body, and a bolt of a bolt and nut connection 9 acts to fix the foot to the body and in adjusted positions thereon.

The forward portion of the body is recessed as at 10 along the upper face thereof to its forward end, and the bracket for attaching the body to the bar A includes a pair of vertically flat parallel side members 11 having a cross piece 12 secured to and bridging the rear ends thereof, for bearing engagement with the recessed end of the body. The side members 11 are pivotally connected to the body by a headed pivot pin 13 and are of a length to extend a considerable distance forwardly of the front end of the body, as best shown in Figure 6. The forward portions of the side members are bent outwardly and reversely upon themselves to provide rearwardly directed portions 14 spaced from and paralleling the side members to provide what may be termed slots 15. The bar A is square cornered and is arranged with one corner uppermost, as clearly shown in Figures 1 and 3, and the side members 11 as well as the rearwardly directed portions 14 are each provided with an inverted V-shaped notch to fit the bar, with the latter mounted within the notches.

The bracket is fixed to the bar by a pair of substantially U-shaped clamps 16, having their arms extending between the side members and the rearwardly directed portions 14, and the bight portions of the clamps are shaped to follow the shape of the bar A. Bearing strips 17 are mounted on the upper ends of the arms of the clamps and bear against the upper edges of the side members and rearwardly directed portions 17, as well as are held accordingly by nuts threaded on the arms, as clearly shown in Figure 3.

In order to prevent undue movement of the body or beam member 1 relative to the attaching bracket as well as to hold the sweep substantially at a uniform height with respect to the ground during the use thereof, I provide spring actuated means for the body, and said means includes front and rear standards or uprights 18 and 19, respectively, each being made from a single strip of metal bent transversely midway its ends to provide spaced lower portions. The rear standard 19 is of greater height than that of the front standard and the lower portions thereof are disposed upon opposite sides of the body 1, as well as are fixed thereto, and the upper end of the rear standard is shaped to provide an eye 20. The spaced lower portions of the front standard are secured to the outer sides of the parallel side members 11 and the upper looped end of the front standard has pivotally mounted therein through the medium of a pivot pin 21, the forward end of a rod 22 that has its rear end portion mounted for slidable movement in the eye 20.

Sleeved on the rod 22 is a coiled spring 23 that has one end convolution bearing against the eye and its opposite convolution bearing against an adjusting collar 24 for the spring, the collar being fixed in adjusted positions on the rod by a set screw 25. A stop collar 26 is secured to the rear end portion of the rod, and the stop collar is likewise provided with a set screw 27 for securing the same in adjusted positions on the rod, as will be apparent. Braces 28 and 29 are provided for the standards, and each brace includes a pair of parallel strips that have their upper ends secured to the standards, and the lower ends of the strips of the brace 28 are secured to the side members 11 while the lower ends of the strips of the brace 29 are secured to the body 1.

From the above description and disclosure in the drawing, it will be obvious that the attaching bracket is fixed to the beam bar A and consequently it is movable therewith, but independently of the beam 1, due to the fact that the latter is pivoted to the bracket, therefore limited up and down movement of the bracket due to irregular ground surface will not materially affect the position of the tool, and the spring 23 places the beam 1 under tension and tends to hold the tool at a uniform level relative to the ground. In any event, the beam 1 will be held in its adjusted position for holding the tool against undue raising movement or digging into the ground.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A cultivator attachment comprising a bracket including a pair of spaced parallel members, rearwardly directed portions formed on the forward ends of said members and spaced therefrom, substantially U-shaped clamps for disposal about cultivator beam attaching means, the arms of the clamps extending between the parallel members and the rearwardly directed portions thereof for securing the backet to said attaching means, an arcuate beam having its forward end portion disposed between the parallel members and pivotally secured thereto, said beam extending rearwardly and downwardly from the parallel members, means secured to the lower end of the beam for attaching a ground engaging tool thereto, a standard secured to and rising from the beam, means pivotally associated with the bracket and slidably mounted through the standard, and a spring mounted on the pivotally associated means and bearing against the standard.

HOLLIE D. BALDWIN.